US012572123B2

(12) United States Patent
Bruch et al.

(10) Patent No.: US 12,572,123 B2
(45) Date of Patent: Mar. 10, 2026

(54) METHOD FOR STARTING UP AN ACTUATOR

(71) Applicant: AUMA Riester GmbH & Co. KG, Müllheim (DE)

(72) Inventors: Dennis Bruch, Wenden (DE); Peter Malus, Müllheim (DE); Jürgen Becher, Müllheim (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 424 days.

(21) Appl. No.: 18/033,679

(22) PCT Filed: Oct. 25, 2021

(86) PCT No.: PCT/EP2021/079527
§ 371 (c)(1),
(2) Date: Apr. 25, 2023

(87) PCT Pub. No.: WO2022/090148
PCT Pub. Date: May 5, 2022

(65) Prior Publication Data
US 2024/0019828 A1     Jan. 18, 2024

(30) Foreign Application Priority Data
Oct. 27, 2020     (DE) ..................... 10 2020 128 240.0

(51) Int. Cl.
G05B 19/042          (2006.01)

(52) U.S. Cl.
CPC ....... G05B 19/0426 (2013.01); G05B 19/042 (2013.01); *G05B 2219/25316* (2013.01)

(58) Field of Classification Search
CPC .. G05B 19/042; G05B 19/0426; G06F 3/0482
See application file for complete search history.

(56) References Cited

U.S. PATENT DOCUMENTS

2004/0148151 A1*   7/2004   Menter .............. G05B 19/0426
                                                        703/22
2020/0103844 A1*   4/2020   Victoriano ......... G05B 19/0426

FOREIGN PATENT DOCUMENTS

CN          113056351 A  *  6/2021  .......... G06F 3/0488
DE          19705543        8/1998
DE          102013112140    5/2015
EP          0808986        11/1997

(Continued)

OTHER PUBLICATIONS

Rotork Controls, "CVQ Series Installation & Maintenance Instructions", 60 pages, Bath, UK, Aug. 2017.

(Continued)

*Primary Examiner* — Mong-Shune Chung
(74) *Attorney, Agent, or Firm* — Volpe Koenig

(57) ABSTRACT

A method for commissioning an actuator (1), includes querying and inputting operating parameters of the actuator (1) one after the other in an interactive menu structure, with at least one path which determines the operating parameters to be queried one after the other being defined in the menu structure, and an acknowledgement of a parameter input causing a jump along the defined path to the next parameter input, in particular wherein the path connects a plurality of branches of the menu structure.

9 Claims, 4 Drawing Sheets

(56)         References Cited

FOREIGN PATENT DOCUMENTS

| | | | | |
|----|----|----|----|----|
| EP | 0859298 | B1 | | 4/2007 |
| EP | 2000875 | | | 12/2008 |
| JP | H04299402 | A | * | 10/1992 |
| JP | H4299402 | A | | 10/1992 |
| JP | H0895624 | A | * | 4/1996 |
| JP | H895624 | A | | 4/1996 |
| JP | 2005273747 | A | * | 10/2005 |
| JP | 2012247068 | A | * | 12/2012 |
| JP | 2019196799 | A | | 11/2019 |

OTHER PUBLICATIONS

Rotork. "CVQ Series QuickStart Guide Quarter-turn Control Valve Actuator" Internet, Retrieved from the Internet: https://www.fagerberR.dk/Files/Images/Products/RotorkCVA/Manuals/pub0, 12-009-000, 0211.pdf, [retrieved on Jan. 17, 2022], XP055879951, pp. 1-12, Jan. 22, 2010.

* cited by examiner

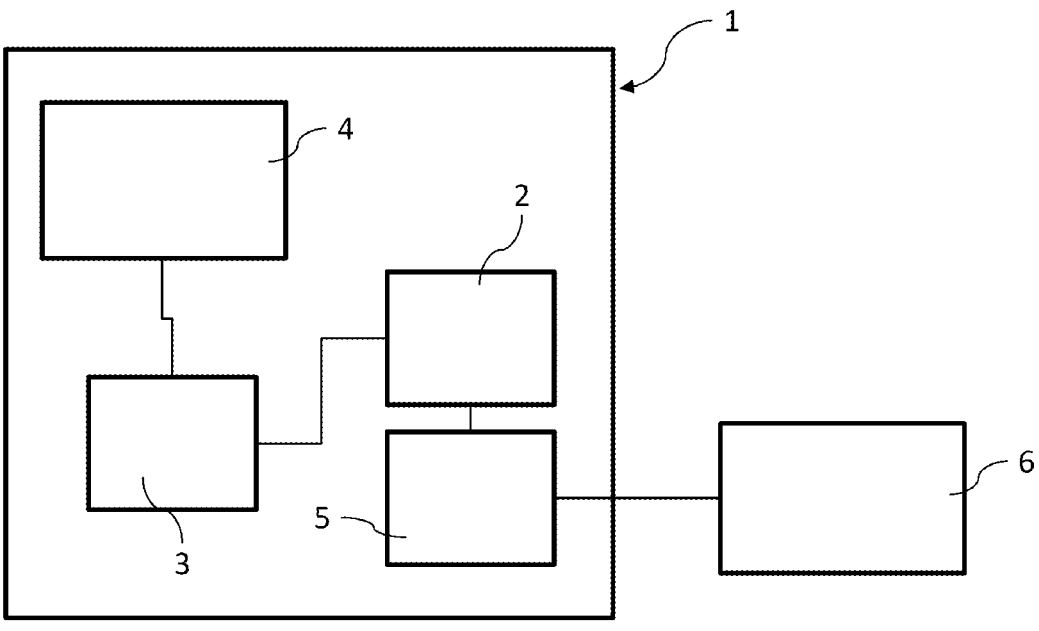
Fig. 1
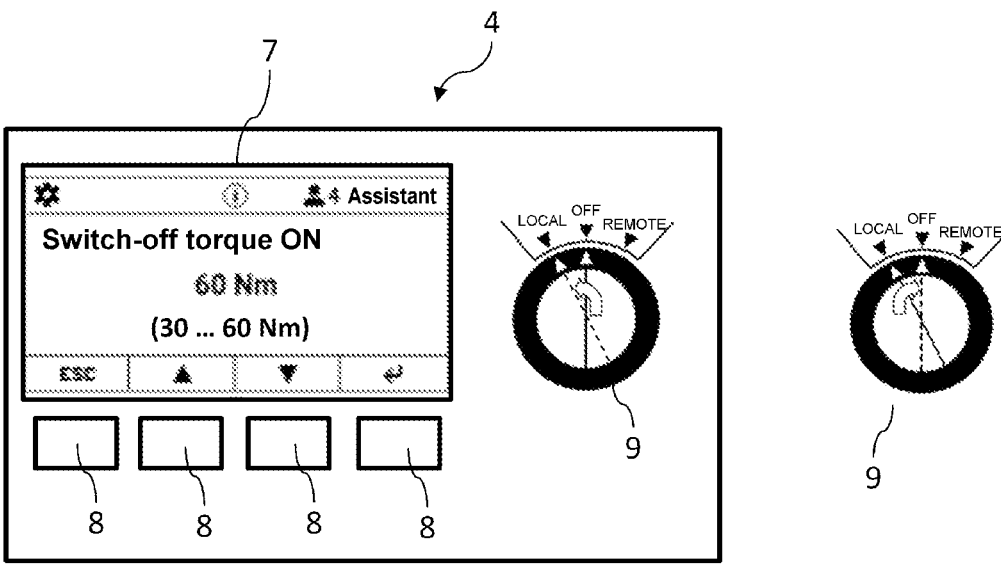
Fig 2A
Fig. 2B 10    11    12

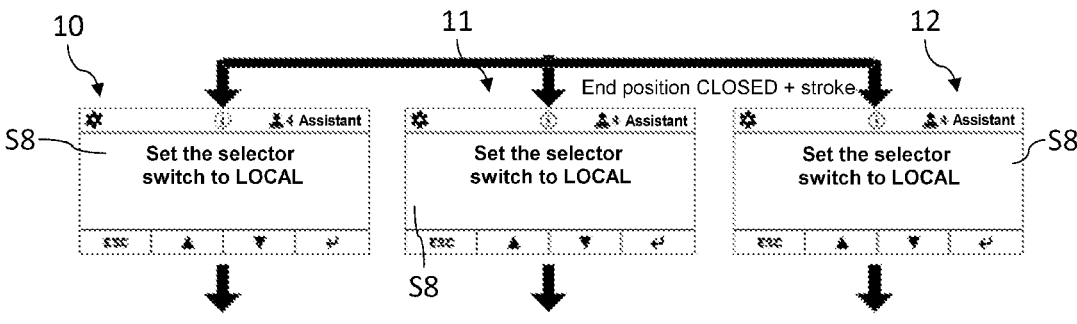

End position CLOSED + stroke

S8 — ⚙ ◎ 👤✳ Assistant
Set the selector
switch to LOCAL
ESC ▲ ▼ ↵

⚙ ◎ 👤✳ Assistant
Set the selector
switch to LOCAL
ESC ▲ ▼ ↵

⚙ ◎ 👤✳ Assistant
Set the selector
switch to LOCAL
ESC ▲ ▼ ↵ — S8

S8

S9
⚙ ◎ 👤✳ Assistant
Close the fitting
using the switch
Confirm using ENTER
ESC ↵

S9 — ⚙ ◎ 👤✳ Assistant
Close the fitting
using the switch
Confirm using ENTER
ESC ↵

⚙ ◎ 👤✳ Assistant
Close the fitting
using the switch
Confirm using ENTER
ESC ↵ — S11

S10
⚙ ◎ 👤✳ Assistant
1500
5  ⏄  2000
M(Nm)
ESC ▲ ▼ ↵

S10 — ⚙ ◎ 👤✳ Assistant
1500
5  ⏄  2000
M(Nm)
ESC ▲ ▼ ↵

⚙ ◎ 👤✳ Assistant
2000
5  ⏄  1500
M(Nm)
ESC ▲ ▼ ↵ — S12

S13
⚙ ◎ 👤✳ Assistant
Set the selector
switch to OFF
ESC ▲ ▼ ↵

S11 — ⚙ ◎ 👤✳ Assistant
Open the fitting
using the switch
Confirm using ENTER
ESC ↵

⚙ ◎ 👤✳ Assistant
Set the selector
switch to OFF
ESC ▲ ▼ ↵ — S13

S14
⚙ ◎ 👤✳ Assistant
Select
a fixed stroke
using the switch
ESC ↵

S12 — ⚙ ◎ 👤✳ Assistant
2000
5  ⏄  1500
M(Nm)
ESC ▲ ▼ ↵

⚙ ◎ 👤✳ Assistant
Select
a fixed stroke
using the switch
ESC ↵ — S14

S15
⚙ ◎ 👤✳ Assistant
12
2000  Revolutions  5
M(Nm)
ESC ▲ ▼ ↵

S13 — ⚙ ◎ 👤✳ Assistant
Set the selector
switch to OFF
ESC ▲ ▼ ↵

⚙ ◎ 👤✳ Assistant
12
1500  Revolutions  5
M(Nm)
ESC ▲ ▼ ↵ — S15

Fig. 4

METHOD FOR STARTING UP AN ACTUATOR

CROSS-REFERENCE TO RELATED APPLICATIONS

This application is a 371 National Phase Application of PCT/EP2021/079527, filed Oct. 25, 2021, which claims priority from German Patent Application No. 10 2020 128 240.0, filed Oct. 27, 2020, both of which are incorporated herein by reference as if fully set forth.

TECHNICAL FIELD

The invention describes a method for commissioning an actuator.

BACKGROUND

With actuators, it is common to set the end positions of the valve in the actual installation situation during initial commissioning. The drive motor can then be switched off when the respective end position has been reached. This can prevent the drive motor of the actuator from moving to the end position with full torque and damaging a controlled valve or gear, for example.

Until now, commissioning has been carried out with the aid of an operating manual, with the aid of which the associated operating parameters of the end positions are input into the actuator control. However, this is time-consuming and error-prone.

SUMMARY

The object of the invention is therefore to improve the commissioning of an actuator.

The object of the invention is achieved using one or more of the features disclosed herein.

Accordingly, operating parameters of the actuator are queried and input one after the other in an interactive menu structure. At least one path which determines the operating parameters to be queried one after the other is defined in the menu structure, and acknowledgement of a parameter input causes a jump along the defined path to the next parameter input.

The operating parameters to be input are queried through the interactive menu structure. Time-consuming programming or inputting of the end position using a user manual is therefore not necessary. This eliminates the otherwise necessary manual navigation from one parameter input to the next. This therefore takes place automatically and enables menu-driven commissioning.

In this case, the menu structure can have a plurality of branches which query various operating parameters. In an advantageous embodiment, the path can connect a plurality of these branches of the menu structure so that a jump can also take place between the branches. Accordingly, the menu structure is not linear, but always defined by the path. The path can therefore directly connect two menu items that are more than one step apart, or in other words, the path can connect two menu items that could otherwise only be reached by moving up and then moving down in the menu structure.

In an advantageous embodiment, a jump within the path depends on the or a previous parameter input. As a result, for example, as described above, a jump can be made from a first branch to a second or third branch of the menu structure depending on the input, but without a need to query the entire second branch. As a result, alternative input options for an operating parameter can be defined, for example.

In one example, a type of parameter specification could thus be queried first, for example whether both end positions, a lower end position and a stroke, or an upper end position and a stroke should be input. Depending on the selection of the three input options, a path is generated that connects the appropriate menu entries for the required operating parameter inputs. In this case, these can also be located in different branches of the menu structure.

In one embodiment, an operating parameter is an end position or a stroke, which can be input directly. Alternatively, an end position can also be calculated from an input operating parameter. For example, after inputting the lower or upper end position and after inputting the stroke in number of revolutions, the respectively other end position can be calculated therefrom. In this way, a more flexible configuration of the actuator is possible. For example, there may be areas of application in which the distance between two end positions is defined by a fixed stroke. In the current state of the art until now, the conversion herefor had to be done manually before setting the end positions. The invention enables here a simpler, faster, and more reliable input. This is because the conversion can automatically take into account a gear and other influencing factors, and incorrect entries are thus reliably avoided.

The operating parameters can be input as numerical values, for example using buttons or switches.

In an advantageous embodiment, a parameter input is effected by moving the actuator into an end position. In this case, the drive motor of the actuator is actually moved to the end position to be set, and this position is set as the operating parameter input. The actuator can be moved, for example, manually using a handwheel or electrically, with the drive motor being controlled using a button or switch, for example. An automated movement into an end position can also take place, with the end position being detected, for example, via a predefined switch-off torque.

In a particularly advantageous embodiment, at least one change of an operating mode is forced within a path. In this way, for example, a specific type of parameter input can be forced, for example the manual movement of the actuator described above.

For example, the operating mode can be changed from a mode in which parameterization is possible to a mode in which displacement of the actuator is possible.

In this case, provision may be made for a jump within the specified path to be executed only if the specified change in the operating state is actually executed. An operating mode selector switch can be provided for this purpose, for example.

In principle, the operating mode can be changed manually by the user. In an advantageous embodiment, the operating mode is changed automatically, as a result of which a forced change is automatically fulfilled. As a result, incorrect operation can be reduced.

In one embodiment, the actuator has at least two operating modes, wherein a manual movement of the actuator is possible in a first operating mode and parameter input is possible in a second operating mode. In this way, the actuator can be prevented from moving during the parameter input. On the other hand, it is thereby also possible to effect a parameter input by moving the actuator, as described above.

In an advantageous embodiment, the difference between two end positions is calculated as number of revolutions or the associated second end position is calculated for an end position and a stroke. This makes it easier to verify whether the respective data are plausible and also makes it easier to move to end positions that are far away, for example.

The number of revolutions can refer to the output shaft of the actuator.

For this purpose, it can be advantageous if the number of increments of an incremental encoder of the drive motor and/or the transmission ratio of the gear are known. These values can be stored as specified values, or they can be queried beforehand within the menu structure. The latter has the advantage that the menu-driven parameter input can be used on every actuator without adjustments.

In a particularly advantageous embodiment, a plausibility check of the input operating parameters is carried out. In this way, incorrect operation and incorrect commissioning can be ruled out.

In the plausibility check, it can be checked, for example, whether the end positions are unequal and whether a difference in the end positions does not exceed a maximum number of increments or revolutions. In particular, the actuator can thus be prevented from being loaded beyond its physical limits.

In an advantageous embodiment, a test drive is carried out with the input operating parameters, in particular after the parameter input has been completed. In this way it can be determined whether the actuator is working as desired.

In a particularly advantageous embodiment, torques occurring during the test drive are recorded and stored as reference values. These reference values can be used, for example, to be able to determine aging of a fitting connected to the actuator at a later point in time.

BRIEF DESCRIPTION OF THE DRAWINGS

The invention will be explained in more detail below using an exemplary embodiment with reference to the accompanying drawings.

Specifically, the figures show:

FIG. 1: a block diagram of an actuator,

FIG. 2A: an operating unit of the actuator of FIG. 1,

FIG. 2B: the operating mode selector switch of FIG. 2A in the "off" position,

FIGS. 3-5: an example of an interactive menu structure for commissioning an actuator with a plurality of branched or alternate paths.

DETAILED DESCRIPTION

Figure 3:
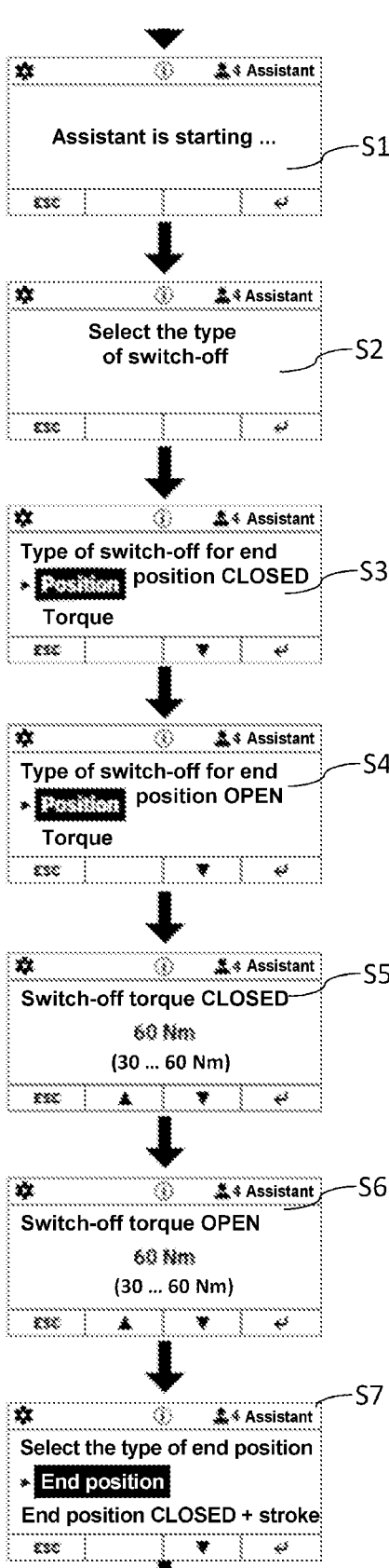

FIG. 1 shows a block diagram of an actuator 1. The actuator has an electric drive motor 2 and a control unit 3 for controlling the drive motor 2. The control unit 3 is connected to an operating unit 4, via which the control unit can be operated by a user.

The drive motor 2 is connected to a gear 5. An actuator element 6, for example a fitting or a valve, is connected to the gear 5. Such actuators are well known in the prior art, which is why no further details are given here.

FIG. 2A shows an example of an operating unit 4 of the actuator. The operating unit 4 has a screen 7 for graphically displaying information and for interactive commissioning in accordance with a method according to the invention. Four keys 8 are arranged below the screen, for example, the functions of which are variable. Instead of the four keys 8, other input means can also be present, such as rotary or rocker switches or buttons. For example, a rotary controller can be used with two coaxial, connected rotary switches whose rotation is magnetically detected.

In addition, the operating unit 4 has an operating mode selector switch 9, which supports three different operating modes in this example.

The "local" operating mode shown enables the drive motor 2 to be operated via the operating unit 4, for example via the keys 8, or in an automated manner. As a result, the drive motor 2 can be opened or closed by pressing a button. Parameterization is now not possible.

In the "Off" operating mode (FIG. 2B), the drive motor 2 is deactivated. A movement of the drive motor is not possible in this operating mode. Parameter inputs are possible in this operating mode, for example.

The "remote" operating mode represents normal operation in which the drive motor may be remotely controlled via a control center, for example. Parameterization is now not possible.

These three operating modes can also be designated differently. There may also be fewer or more modes of operation.

Figure 5:
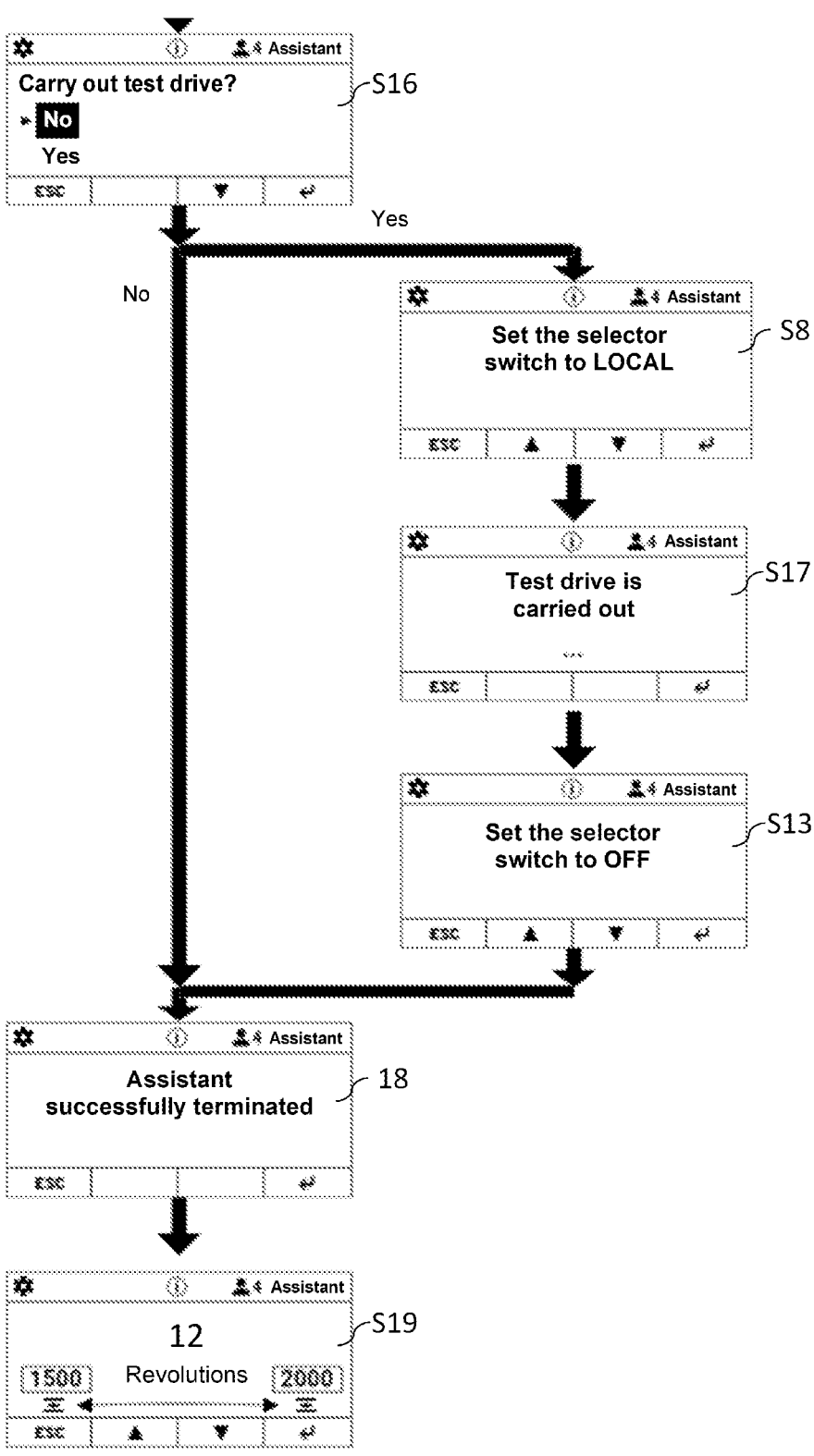

FIGS. 3-5 show an example of an interactive menu structure for commissioning an actuator.

The interactive menu structure for commissioning is started, for example, when it is first switched on or by selecting a commissioning assistant S1. In the example, the interactive menu structure contains at least one path that determines the operating parameters to be queried one after the other. A jump along the defined path to the next parameter input occurs only after a parameter input has been acknowledged.

The interactive menu structure shown in the example uses a screen 7 of the operating unit 4 for the graphical display of the operating parameters that have been queried and input. Only one operating parameter is queried on a displayed screen page. In this way, a clear display and input can take place even on small screens. The user is guided interactively through the commissioning, and after acknowledgement they are always shown exactly the next required operating parameter for input.

In the example, the interactive menu structure is therefore organized in screen pages. Each of these screen pages corresponds to one parameter input, with information pages that do not contain any parameter input but only display text also being able to be present. However, all screen pages must be acknowledged in order to get to the next screen page.

The path therefore connects specific screen pages and thus defines the order of the screen pages displayed one after the other. The path can also connect screen pages that are in different branches with one another, for example. As a result, a non-linear sequence or a sequence that is not specified by the menu structure can be defined by screen pages.

The path can also contain branches, with the further course of the path being changed depending on a parameter input.

In the example, a note S2 regarding the subsequent selection of the type of switch-off is shown. After acknowledgement of this screen, the type of switch-off for end position CLOSED is selected, S3. In the example, position and torque can be selected here. In the case of other actuators, further or other types of switch-off may be available.

The type of switch-off for end position OPEN is then selected, S4.

Then the parameters for the switch-off torque CLOSED, S5, and the switch-off torque OPEN, S6, are input.

Then the selection S7 is made as to how the two end positions are to be input. Both end positions can be input. The end position CLOSED and a stroke of the drive motor or the end position OPEN and the stroke can be input. The path leads to a different branch of the menu structure, depending on the selection.

FIGS. 2A and 2B show these alternative branches and the associated paths. The first path 10, in the picture on the left, queries both end positions. In the subsequent step S, a change in the operating mode is first forced. For this purpose, an operating mode selector switch 9 according to FIG. 2A can be present. In the example, it is first necessary to switch to the "local" operating mode, as shown for example in FIG. 2B. As described in relation to FIG. 2A, manual control of the drive motor via the operating unit 4 is possible in the "local" operating mode. Toggling the operating mode selector switch 9 can acknowledge this screen.

A note S9 that the drive motor should be closed via keys 8 follows. The actuator is then closed using the keys 8, S10. The end position to which the actuator has been moved is set as operating parameter.

A note S11 that the drive motor should be opened via keys 8 follows. Then the actuator is opened via the keys 8, S12. The end position to which the actuator has been moved is set as operating parameter.

The second path 11, in the middle of the picture, includes the input of the end position CLOSED and a fixed stroke of the drive motor. Steps S8 to S10 correspond to the first path 10. The associated screens can actually be present only once in the menu structure. The path then connects the appropriate screens across the branches so that only the required screens are displayed and queried. Such identical screens are each provided with the same reference signs below.

After inputting the position, the operating mode must first be changed to "Off" by moving the operating mode selector switch 9 to the appropriate position (FIG. 2B), S13. This is followed by a note S14 regarding inputting the stroke and inputting the stroke value itself, S15, using the keys 8.

The third path 12, on the right in the picture, includes the input of the end position OPEN and a fixed stroke of the drive motor. After the operating mode was changed to "local" in S8, the opening of the actuator is now indicated, S11, and then the actuator is opened via the keys 8, S12. Steps S13 to S15 of the second path follow.

In the second and third paths, the missing end position is calculated from the input end position and the stroke. The stroke can first be converted here into revolutions or increments of a rotary encoder.

In principle, a plausibility check can be carried out after each input, and so an incorrect input is impossible. If an invalid value is determined, the acknowledgement can be refused so that it is not possible to jump to the next parameter input. The erroneous value can be highlighted on the screen, or another error message can be displayed.

For example, the two end positions must not be the same and must also not be further apart than the maximum number of increments that are achievable by a complete displacement of the actuator.

In the present example, the respective value of the incremental encoder is logged when the first position value is set. Then the number of increments is counted until the second value is reached. If the maximum number of increments is exceeded here, which may be more than 65,000 (e.g. $2^{16}$), counting starts from zero. The difference in the position values must therefore not be greater than this value.

Instead of actually moving the drive motor to the end positions, it might also be possible to simply input a numerical value. No operating mode switching would be required for this.

This completes the parameter input. FIG. 5 shows the further course of the interactive menu structure. In a step S16, it can be selected whether a test drive is to be carried out with the input operating parameters.

If so, the operating mode is first switched to "local" in S8, and then a test drive is carried out, S17. In this case, positions and/or torques can be stored as reference values so that they are available for later comparison purposes. After the end of the test drive, the operating mode is switched back to "Off", S13.

Then, or if no test drive was desired, a message S18 that commissioning is complete is provided. The set operating parameters are then shown again in an overview S19.

The menu structure shown here is only an example. Depending on the application, other or additional operating parameters can be queried and input.

In deviation from FIG. 1, the operating unit 4 does not necessarily have to be arranged in or at the actuator 1 or be connected to it. The operating unit 4 can also be implemented as an app, for example on a smartphone, a tablet or a notebook.

In this way it is possible, for example, to design the actuator 1 without an operating unit 4, and in particular without a screen 7, which means that costs can be saved. The operating mode selector switch 9 can still be physically arranged on the actuator 1 so that incorrect operation via an app is ruled out.

LIST OF REFERENCE SIGNS

1 Actuator
2 Drive motor
3 Control unit
4 Operating unit
5 Gear
6 Actuator element/fitting/valve
7 Screen
8 Key
9 Operating mode selector switch
10 First path
11 Second path
12 Third path
S1 Note "Assistant is starting"
S2 Note "Select type of switch-off"
S3 Input type of switch-off end position CLOSED
S4 Input type of switch-off end position OPEN
S5 Input switch-off torque CLOSED
S6 Input switch-off torque OPEN
S7 Input "end position type"
S8 Operating mode selection "local"
S9 Note "Close fitting"
S10 Input by moving to position end position CLOSED
S11 Note "Open fitting"
S12 Input by moving to position end position OPEN
S13 Operating mode selection "Off"
S14 Note "Input stroke"
S15 Input stroke
S16 Input "Carry out test drive"
S17 Carry out test drive
S18 Note "Input complete"
S19 Note "Overview"

The invention claimed is:

1. A method for commissioning an actuator (1) for a valve or fitting, the method comprising:

providing the actuator (1) having an operating unit (4), wherein the operating unit (4) has at least one operating mode selector switch (9) and a screen (7);

querying and inputting operating parameters of the actuator (1) one after the other in an interactive menu structure, wherein the interactive menu structure is organized in screen pages;

defining at least one path which determines the operating parameters to be queried one after the other in the menu structure;

an acknowledgement of a parameter input causing a jump along the defined path to the next parameter input;

wherein the actuator (1) has at least two operating modes and a user effecting a change of the operating mode by the at least one operating mode selector switch, wherein in a first operating mode a manual movement of the actuator is possible and in a second operating mode a parameter input is possible;

wherein within a path at least one manual change to the first operating mode (S8, S13) is enforced;

executing a jump within a predetermined said path only if the change of the operating mode (S8, S13) is actually executed;

switching the operating mode selector switch acknowledging a screen page that forces the change to the first operating mode; and in the first operating mode, moving the actuator to an end position and setting this end position as the parameter input.

2. The method as claimed in claim 1, wherein a jump within the path depends on a previous operating parameter input.

3. The method as claimed in claim 1, further comprising calculating an end position from an input operating parameter.

4. The method as claimed in claim 1, further comprising calculating an associated number of revolutions for a difference of two end positions or an associated second end position for an end position.

5. The method as claimed in claim 1, further comprising carrying out a plausibility check of the input operating.

6. The method as claimed in claim 5, wherein the plausibility check includes checking whether the end positions are unequal and whether the difference in the end positions does not exceed a maximum number of increments.

7. The method as claimed in claim 1, further comprising carrying out a test drive (S17) with the input operating parameters, and recording and storing torques that occur as reference values.

8. The method as claimed in claim 1, wherein the defined path connects multiple branches of the menu structure.

9. An actuator (1) for a valve or a fitting, the actuator (1) comprising: a drive motor (2) and an operating unit (4), the operating unit (4) has at least one operating mode selector switch (9), a screen (7) and keys (8) for parameter input, and the actuator (1) is configured to carry out a method including: querying and inputting operating parameters of the actuator (1) one after the other in an interactive menu structure, wherein the interactive menu structure is organized in screen pages;

defining at least one path which determines the operating parameters to be queried one after the other in the menu structure;

an acknowledgement of a parameter input causing a jump along the defined path to the next parameter input;

wherein the actuator (1) has at least two operating modes and a user effecting a change of the operating mode by the at least one operating mode selector switch, wherein in a first operating mode a manual movement of the actuator is possible and in a second operating mode a parameter input is possible;

wherein within a path at least one manual change to the first operating mode (S8, S13) is enforced;

executing a jump within a predetermined said path only if the change of the operating mode (S8, S13) is actually executed;

switching the operating mode selector switch acknowledging a screen page that forces the change to the first operating mode; and in the first operating mode, moving the actuator to an end position and setting this end position as the parameter input.

* * * * *